United States Patent [19]

Kasperski

[11] Patent Number: 4,895,490

[45] Date of Patent: Jan. 23, 1990

[54] INTERNAL BLADE RETENTION SYSTEM FOR ROTARY ENGINES

[75] Inventor: Donald J. Kasperski, Jupiter, Fla.

[73] Assignee: The United States of America as represented by the Secretary of the Air Force, Washington, D.C.

[21] Appl. No.: 276,721

[22] Filed: Nov. 28, 1988

[51] Int. Cl.$^4$ .............................................. F01D 5/32
[52] U.S. Cl. ..................................... 416/221; 416/218
[58] Field of Search .................... 416/218, 221, 220 R

[56] References Cited

U.S. PATENT DOCUMENTS

| | | | |
|---|---|---|---|
| 1,606,029 | 11/1926 | Herr | 416/218 X |
| 1,890,581 | 12/1932 | Köhler | 416/221 X |
| 2,713,991 | 7/1955 | Secord et al. | |
| 2,867,408 | 1/1959 | Kolb et al. | |
| 3,610,777 | 10/1971 | Wagle | 416/198 |
| 3,807,898 | 4/1974 | Guy et al. | 416/218 X |
| 3,814,539 | 6/1974 | Klompas | 416/218 X |
| 4,022,545 | 5/1977 | Shank | 416/221 |
| 4,189,282 | 2/1980 | Benoist et al. | 416/221 |
| 4,389,161 | 6/1983 | Brumen | 416/218 X |

FOREIGN PATENT DOCUMENTS

| | | | |
|---|---|---|---|
| 1811007 | 6/1970 | Fed. Rep. of Germany | 416/221 |
| 1128113 | 1/1957 | France | 416/221 |
| 472403 | 7/1952 | Italy | 416/221 |
| 238287 | 12/1969 | U.S.S.R. | 416/218 |
| 1130693 | 12/1984 | U.S.S.R. | 416/221 |
| 906476 | 9/1962 | United Kingdom | 416/221 |

Primary Examiner—Everette A. Powell, Jr.
Attorney, Agent, or Firm—Donald J. Singer

[57] ABSTRACT

The invention comprises an internal blade retention system for rotary engines and particularly for gas turbine engines. The system comprises a rotary disk 12 positioned for rotation within the turbine engine, the disk having a multitude of dovetail blade slots 16 and a groove 12E centrally positioned on its circumferential edge and cutting across the blade slots. A preloaded circular snap ring 10 is positioned in the centrally located groove 12E on the disk edge and in its relaxed position the snap ring extends radially outward from the groove. Multiple blades 14 are installed onto the blade seats in the disk, each of the blades having a base with a centrally located goove 14E that engages the snap ring 10 in order to axially lock the blade in its seat.

2 Claims, 1 Drawing Sheet

INTERNAL BLADE RETENTION SYSTEM FOR ROTARY ENGINES

STATEMENT OF GOVERNMENT INTEREST

The invention described herein may be manufactured and used by or for the Government or for governmental purposes without the payment of any royalty thereon.

TECHNICAL FIELD OF THE INVENTION

This invention relates to axial locking of rotor blades for compressors, turbines and other rotary type devices wherein the blades are of the type which are inserted axially into the periphery of a rotary disk having dovetail or serrated slots.

BACKGROUND OF THE INVENTION

One common method of locking compressor or turbine blades against axial movement, which is in the direction substantially parallel to the rotary axis of the disk, is accomplished by use of external hooks on the blades and a circular snap ring. The conventional hook and snap ring configuration makes use of a slotted extension, or hook, on one axial edge of the blade to provide a seat for the snap ring. The snap ring is provided with a relaxed diameter that forces it to seat tightly in the slot provided by the hook.

While performing its retention function effectively, the hook and snap ring configuration suffers from a number of disadvantages which have become more prominent in the continuing effort to lower aircraft engine weight and improve aerodynamic efficiency. Firstly, the external hook adds dead weight without helping to maintain aerodynamic efficiency. Such hooks also produce windage during rotation of the blade and disk assembly, which reduces the overall aerodynamic efficiency of the combination.

The external hook and snap ring scheme also poses a substantial risk of blade loss due to hook or snap ring failure. This external hook arrangement is particularly susceptible to foreign object damage (FOD) resulting in blade release. Foreign objects inadvertently passing through the flow stream of a gas turbine or other type of rotary engine may impact this exposed hook and snap ring configuration and result in a catastrophic release of blades. Other common methods of externally locking blades into position upon a rotary disk suffer from similar disadvantages.

A need therefore exists for a blade retention system that reduces dead weight and windage losses associated with external locking arrangements.

A further need exists for a blade retention system that is more resistant to foreign object damage (FOD).

SUMMARY OF THE INVENTION

The invention comprises an internal blade retention system for rotary engines and particularly for gas turbine engines. The system comprises a rotary disk positioned for rotation within the turbine engine, the disk having a multitude of dovetail blade slot and a groove centrally positioned on its circumferential edge and cutting across the blade slot preloaded circular snap ring is positioned in the centrally located groove on the disk edge and in its relaxed position the snap ring extends radially outward from the groove. Multiple blades are installed onto the blade seats in the disk, each of the blades having a base with a centrally located groove that engages the snap ring in order to axially lock the blade in its slots.

In the preferred embodiment of the invention the blades can be further characterized by a dovetail base for sliding axial engagement with the correspondingly formed slots on the rotary disk. The blades may further comprise platform sections adjacent to the dovetail base for helping to direct fluid flow adjacent to the disk. The platforms are provided with a slot which allows access to the blade locking snap ring during assembly and disassembly of the blades to the disk.

In the preferred embodiment of the invention, the snap ring is initially installed into the central groove and pressure is applied inward on the snap ring in order to locally depress it when a blade is slid axially into its seat. When the applied pressure is released, the snap ring springs into position in the central groove at the dovetail base of the blade, thereby axially locking the blade in its seat.

It is therefore an object of this invention to provide an axial blade locking retention system for rotor blades which is simple to manufacture and effective for axially locking blades in position.

It is an advantage of this internal blade retention system that the blades are axially locked into position without necessitating increased engine weight and without causing inefficient windage during engine operation.

It is a further advantage of this internal blade retention system that the retention means is protected from damage arising from foreign objects traveling through the engine flow path.

Another object of this invention is provide a blade retention system that provides improved dimensional control of blade position compared to conventional systems.

BRIEF DESCRIPTION OF THE DRAWINGS

The foregoing and other objects and advantages of the invention will be apparent from the following more particular description of the preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

The invention comprises an improved internal blade retention system which utilizes a centrally located snap ring 10 in a rotary disk 12 to axially lock a rotor blade 14 in a preferred slot 16.

Figure 1:
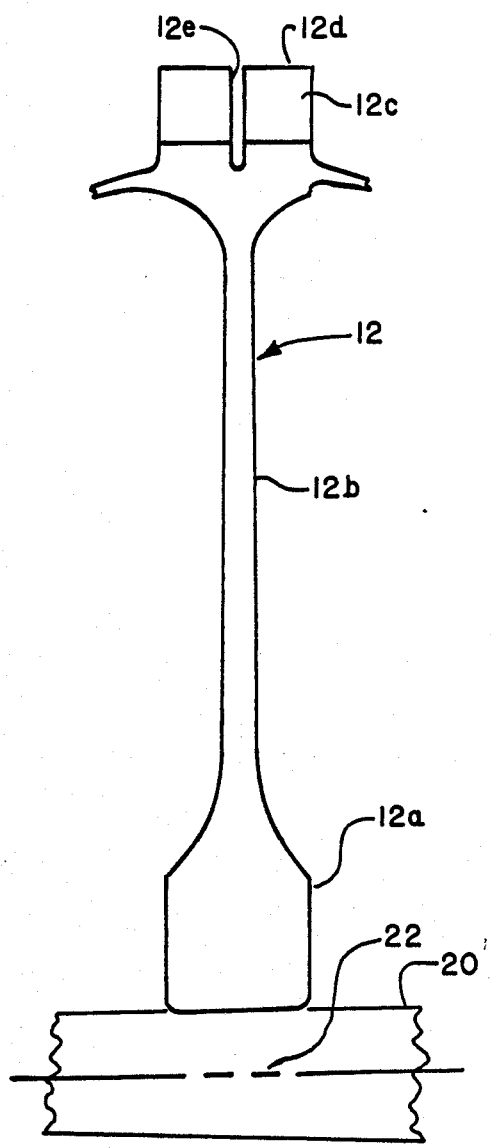
FIG. 1 is a one-half cross section of a rotary disk embodying the principles of this invention.
Figure 3:
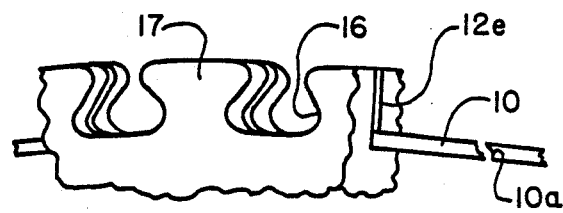
FIG. 3 is a partially broken away side view of the disk of FIG. 1 and also includes a partial view of a snap ring which has been pushed into a slot to allow for blade installation.
Figure 2:
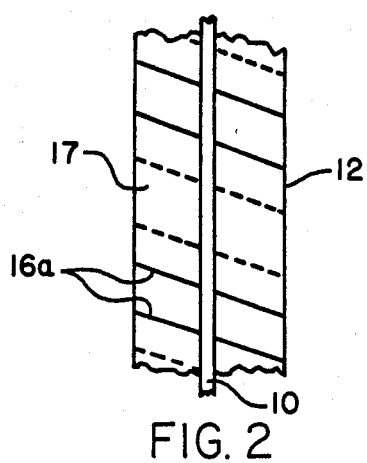
FIG. 2 is a partially broken away edge view of the disk of FIG. 1.

FIG. 1 is a one-half cross-sectional view of a disk 12 for use in a rotary engine and specifically a gas turbine engine. The disk 12 is mounted on a central shaft 20 for rotation about a central axis 22. Disk 12 is a typical compressor rotor disk which has been modified according to the principles of this invention. A disk hub section 12a is connected by a thin disk 12b to a blade slot area 12c. internal snap ring slot 12E is centrally located on circumferential edge 12d of the rotary disk. Snap ring 10 is positioned in slot 12E and extends through all dovetail blade slots 16 and posts 17 (FIG. 3). In its relaxed condition, snap ring 10 extends radially outward from the first groove 12e into the blade seats 16. Groove 12e is oriented perpendicular to the rotational axis of the rotary engine. As shown in FIG. 3, the snap ring has been pushed inward for blade installation. The protected central location of slot 12E and the snap ring 10 can be readily seen with reference to FIG. 2 which is a side elevation of disk 12 showing the circumferential edge of the disk. Entrance 16a of dovetail blade slot 16 is also shown in this view.

Figure 4:
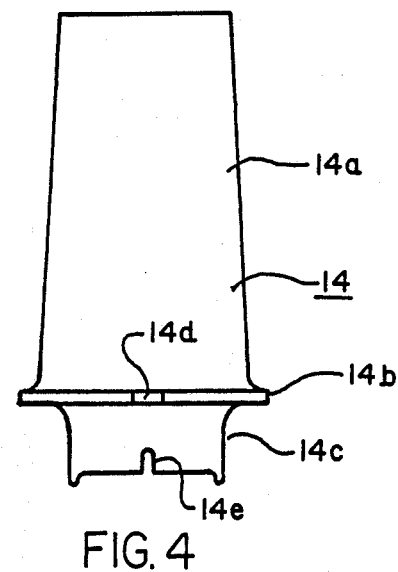
FIG. 4 is a side view of a typical rotor blade for installation in the disk of FIG. 1.
Figure 5:
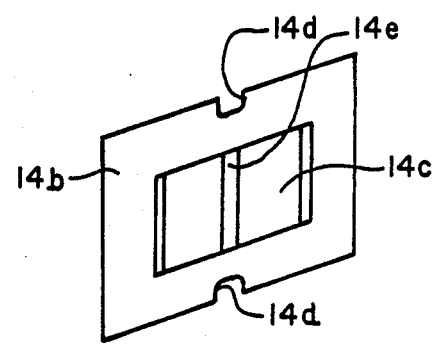
FIG. 5 is a plan view of the underside of the blade of FIG. 4.

FIGS. 4 and 5 show a typical compressor blade 14 incorporating the principles of this invention. The blade, as shown in the side of FIG. 4, comprises an airfoil section 14a, a blade platform 14b and a dovetail base 14c. Centrally located in the dovetail base 14c is an internal slot 14e for axial engagement with preloaded snap ring 10. Slot 14e may also be described as a second groove, also oriented perpendicular to the rotary engine axis, and the second groove is aligned with the first groove, both grooves extending in a radial direction. For a full platform blade, as shown, notches 14d are formed on adjacent blade platforms 14b permit access to the snap ring 10. A thin tool is slid through notches 14d and is positioned in slot 12e to depress snap ring 10 into the slot 12e in order to allow axial assembly and disassembly of a blade 14. A small slot 10a (FIG. 3) in the snap ring 10 allows free depression of the ring when pushed inward. When pressure is released from the preloaded snap ring, it returns to its relaxed position engaging slot 14e on the blade and slot 12e at posts 17 of the disk. This dual engagement feature of the snap ring axially locks blades 14 onto the disk 12. In the preferred embodiment of the invention therefore, the preloaded snap ring is initially installed into slot 12e of the disk 12. Pressure is then applied (radially inward) on the snap ring in order to locally depress the snap ring into the disk slot 12e at the blade slot 16. Blades are then slid axially onto the disk at the blade slot 16. Releasing the snap ring from the applied pressure allows the snap ring to spring outward into the circumferential groove 14e in the underside of the correctly positioned blades 14. This axially locks the blades in the blade seat 16 through the engagement of the snap ring with the blades 14 and posts 17.

The internal blade retention system of this invention reduces dead weight and windage losses associated with the external hook and snap ring configurations since it does not require additional structure for blade locking. This configuration is also less likely to be subject to a loss of blade retention due to snap ring failures or foreign object damage (FOD) as compared with external hook and snap configurations. The risk is minimized because the snap ring is fully contained and protected in the blade base 14c and disk groove 12e. It is possible to further decrease windage by putting removable plugs in the notches 14d formed on blade platforms 14b. Further, platform notches 14d may not be needed on more than a few blades in many applications.

The central location of slot 12e and 14e allows for tight dimensional clearances between the snap ring, blade seat and blade, this results in a dimensionally improved assembly of these components. Such improved dimensional control of blade position results in a higher average efficiency compressor (or turbine) stage. The manufacturing tolerances of external hooks (and therefore the blades) can not be so tightly controlled by standard methods of blade manufacturing. Removal of these external hooks and slot should also help reduce unwanted blade and disk resonant frequencies.

While the invention has been described with reference to the preferred embodiment thereof it will be understood by those skilled in the art that various changes in substance and form can be made therein without departing from the spirit and scope of the invention as detailed in the appended claims.

I claim:

1. Blade retention system for a rotary engine having an axis of rotation comprising:
   a disk positioned for rotation within said rotary engine, said disk having a first circumferential groove positioned centrally on its circumferential edge, and extending perpendicular to said axis of rotation;
   a preloaded circular snap ring positioned in said first groove, said snap ring being mechanically biased to extend radially outwardly from said first groove; and
   multiple blades for installation in said disc, each of the said blades having a base with a second, centrally located, fully enclosed groove, extending perpendicular to said axis of rotation and aligned with said first groove for engagement with said snap ring which locks said blades into blade slots in said disk when bases of said blades are slid into corresponding blade slots; and
   wherein said blades are further characterized by dovetail bases for sliding engagement with corresponding blade slots on said disk.

2. The internal blade retention system of claim 1 wherein said blades are further characterized by platform sections adjacent to said blade bases which help to direct fluid flow adjacent to said disk, said platforms provided with an notch for allowing access to said snap ring during assembly and disassembly of said blades to and from said disk.

* * * * *